United States Patent
Kim et al.

(10) Patent No.: US 7,492,396 B2
(45) Date of Patent: Feb. 17, 2009

(54) DIGITAL IMAGE PROCESSING APPARATUS AND METHOD THEREOF

(75) Inventors: Moon-cheol Kim, Yongin-si (KR); Il-do Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 777 days.

(21) Appl. No.: 11/011,621

(22) Filed: Dec. 15, 2004

(65) Prior Publication Data

US 2005/0134705 A1 Jun. 23, 2005

(30) Foreign Application Priority Data

Dec. 22, 2003 (KR) ............... 10-2003-0094376

(51) Int. Cl.
H04N 9/68 (2006.01)
H04N 9/093 (2006.01)
H04N 9/04 (2006.01)
H04N 9/083 (2006.01)
G06K 9/00 (2006.01)
G06K 9/32 (2006.01)

(52) U.S. Cl. ............... 348/234; 348/263; 348/279; 348/280; 382/167; 382/300

(58) Field of Classification Search ............... 348/234, 348/272; 382/300
See application file for complete search history.

(56) References Cited

U.S. PATENT DOCUMENTS

| 5,382,976 | A | | 1/1995 | Hibbard | |
|---|---|---|---|---|---|
| 6,091,862 | A | * | 7/2000 | Okisu | 382/300 |
| 6,803,955 | B1 | * | 10/2004 | Yosida | 348/272 |
| 6,825,876 | B1 | * | 11/2004 | Easwar et al. | 348/234 |
| 6,943,831 | B2 | * | 9/2005 | Gallagher et al. | 348/222.1 |
| 7,088,392 | B2 | * | 8/2006 | Kakarala et al. | 348/272 |
| 7,102,655 | B2 | * | 9/2006 | Toji et al. | 345/694 |
| 2002/0167602 | A1 | | 11/2002 | Nguyen | |
| 2003/0011693 | A1 | * | 1/2003 | Oda | 348/272 |

(Continued)

FOREIGN PATENT DOCUMENTS

JP 11-284834 10/1999

(Continued)

OTHER PUBLICATIONS

Nai-Xiang Lian, "Adaptive Filtering for Color Filter Array Demosaicking," IEEE Transactions on Image Processing, Oct. 10, 2007, vol. 16, pp. 2515-2525.*

(Continued)

*Primary Examiner*—Ngoc-Yen T Vu
*Assistant Examiner*—Michael Osinski
(74) *Attorney, Agent, or Firm*—Stanzione & Kim, LLP

(57) ABSTRACT

A digital image processing apparatus and a method thereof. The apparatus includes a CCD to photoelectrically transform an optical image which is imaged through a lens part, using a mosaic color filter array pattern, a buffer to store a color data output from the CCD by a pixel, in a predetermined unit, and an ADSE logic to color-interpolate a spatially missing color data by adaptively applying a luminance significance element value to a certain color interpolation method, the luminance significance element value indicating contribution of each color to an entire luminance with respect to each pixel color data stored in the buffer.

28 Claims, 5 Drawing Sheets

U.S. PATENT DOCUMENTS

| | | |
|---|---|---|
| 2003/0052981 A1 | 3/2003 | Kakarala et al. |
| 2005/0201616 A1* | 9/2005 | Malvar et al. ............... 382/167 |

FOREIGN PATENT DOCUMENTS

| | | |
|---|---|---|
| JP | 2001-95001 | 4/2001 |
| JP | 2001-320722 | 11/2001 |
| JP | 2002-64819 | 2/2002 |
| KR | 1998-42697 | 8/1998 |
| KR | 2001-56442 | 9/2001 |

OTHER PUBLICATIONS

Menon, Daniele, "Demosaicing Based On Wavelet Analysis of the Luminance Component," IEEE International Conference on Image Processing 2007, Sep. 16, 2007-Oct. 19, 2007, vol. 2, pp. II 181-II 184.*

* cited by examiner

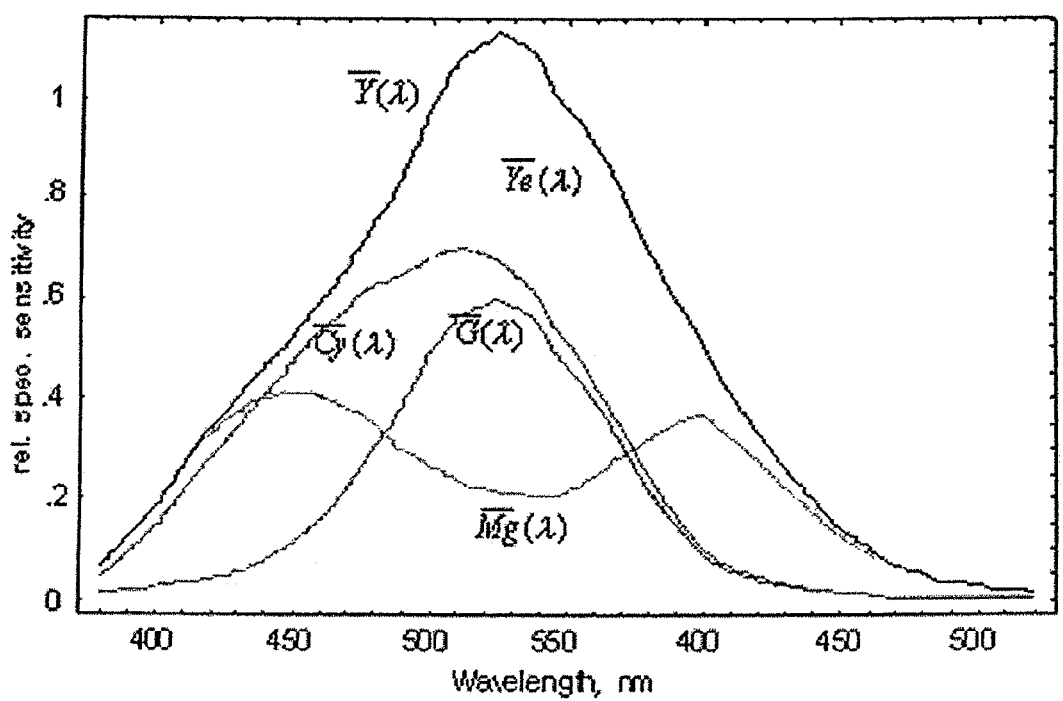

DIGITAL IMAGE PROCESSING APPARATUS AND METHOD THEREOF

CROSS-REFERENCE TO RELATED APPLICATIONS

This application claims the benefit under 35 U.S.C. § 119(a) from Korean Patent Application No. 2003-94376, filed Dec. 22, 2003 in the Korean Intellectual Property Office, the disclosure of which is incorporated herein by reference and in its entirety.

BACKGROUND OF THE INVENTION

1. Field of the Invention

The present general inventive concept relates to a digital image processing apparatus, and a method and system thereof. More specifically, the present general inventive concept pertains to a digital image processing apparatus, which can calculate spatially missing color data using color information of neighboring pixels with respect to an output image of a charge coupled device (CCD) adopting a color filter array, and a method thereof.

2. Description of the Related Art

In general, a digital image processing device such as a digital still camera or a digital video camera processes digital images using a single image sensor and adopts a mosaic color filter array pattern. Since an image sensor, such as a charge coupled device (CCD), basically measures only the intensity of light, a color filter array is used to present colors, and a single color is allotted to each pixel.

Missing color data needs to be calculated using color information of neighboring pixels with respect to an output image of the CCD using the color filter array. This process is referred to as a color interpolation or a color demosaicing algorithm.

FIG. 1 is a block diagram illustrating an example of the conventional digital image processing device. As shown in FIG. 1, the digital image processing device includes a lens part 10, a CCD 20, a buffer 30, a digital signal processor (DSP) 40, and an output part 50.

The lens part 10 includes a zoom lens for enlarging and reducing magnification of an object, a focus lens for adjusting focus of the object, and an iris for adjusting the intensity of radiation. The CCD 20, which is used as a coupled device, photoelectrically transforms a photographed image into an electrical signal. The buffer 30 stores the photoelectrically-transformed image.

The DSP 40 interpolates color of output data from the RGB mosaic CCD 20, which has one of red (R), green (G), and blue (B) color at each pixel, so that each pixel can have all of the color data of R, G and B. The output part 50 converts the interpolated data of the DSP 40 to a displayable signal and outputs the converted signal.

FIG. 2 is a detailed block diagram of the DSP 40 in FIG. 1. Referring to FIGS. 2 and 4, an adaptive interpolation logic 42 interpolates colors by using green color G which is similar to luminance. For example, in the RGB mosaic CCD 20 having only one of red (R), green (G), and blue (B) color at each pixel as shown in FIG. 3, the G33 is interpolated with respect to the pixel R33 based on the following equation.

$$G33 = [G32 + (R33 - R31)/2 + (G34 + (R33 - R35)/2]/2 \quad \text{[Equation 1]}$$
$$= (G32 + G34)/2 + (-R31 + 2*R33 - R35)/4$$

In Equation 1, G33 is calculated by adding a peak component of R to a linear interpolation value of G to thus generate a high-resolution signal and reduce a "zipper" effect. FIG. 4 depicts such a color interpolation. The signal of high resolution is generated and the "zipper" effect is reduced through the color interpolation method. Difference interpolation logics 46a and 46b each interpolates a difference from G output from the adaptive interpolation logic 42 with respect to R and B using the linear interpolation, and interpolates R and B by adding G output from the adaptive interpolation logic 42. That is, when R and B are interpolated, high frequency of G having a high frequency band is added to realize the high resolution. The above conventional digital image processing device is disclosed in US Publication No. 2003/052981, published on Mar. 20, 2003.

When the conventional digital image system interpolates G, the peak component of R or B is used to enhance the resolution. Similarly, in interpolating R and B, the peak component of G is used to enhance the resolution. However, when only the peak component is used without considering influence on a luminance component, the "zipper" effect is not reduced or the resolution is not enhanced efficiently since the reduction of the "zipper" effect or the resolution enhancement is closely associated with the luminance component.

SUMMARY OF THE INVENTION

Accordingly, the present general inventive concept provides a digital image processing apparatus capable of realizing high resolution images and reducing the so-called "zipper" effect by interpolating colors in consideration of contribution of each color with respect to the entire luminance, and a method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a digital image processing apparatus including a charge coupled device (CCD) to photoelectrically transform an optical image, which is imaged through a lens part, using a mosaic color filter array pattern, a buffer to store color data output from the CCD by a pixel into a predetermined unit, and an adaptive dual slope estimation (ADSE) logic to color-interpolate spatially missing color data by adaptively applying a luminance significance element value to a certain color interpolation method, the luminance significance element value indicating contribution of each color to an entire luminance with respect to each pixel color data stored in the buffer.

The digital image processing apparatus may further include an output part to convert the color data interpolated in the ADSE logic to a displayable signal and output the displayable signal.

The ADSE logic can perform the color interpolation by adding a component calculated by applying the certain color interpolation method with respect to color data of pixels neighboring a pixel to be interpolated, with a value interpolated by adaptively applying the luminance significance element value to a peak value of other color data of the neighboring pixels.

The CCD may be one of a YMCG mosaic sensor, an RGB mosaic sensor, a YCGW mosaic sensor and a YCG mosaic sensor.

The certain color interpolation method may be one of a linear interpolation, a bilinear interpolation, a Cubic interpolation and a Polyphase interpolation.

The foregoing and/or other aspects and advantages of the present general inventive concept may also be achieved by providing a digital image processing method including photoelectrically transforming an optical image, which is imaged through a lens part, using a mosaic color filter array pattern, storing color data, output from a charge coupled device (CCD) by a pixel, in a predetermined unit, and color-interpolating a spatially missing color data by adaptively applying a luminance significance element value to a certain color interpolation method, the luminance significance element value indicating contribution of each color to an entire luminance with respect to each pixel color data stored in the buffer.

The method may further include converting the color data interpolated in the ADSE logic to a displayable signal and outputting the displayable signal.

The operation of color-interpolating the color data can perform the color interpolation by adding a component calculated by applying the predetermined color interpolation method with respect to color data of pixels neighboring a pixel to be interpolated, with a value interpolated by adaptively applying the luminance significance element value to a peak value of other color data of the neighboring pixels. The predetermined unit may be one of a field and a frame. The certain color interpolation method may be one of, a linear interpolation, a bilinear interpolation, a Cubic interpolation and a Polyphase interpolation.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 7 is a view illustrating a configuration of a YMCG mosaic CCD;

FIG. 8 is a graph illustrating the spectrum sensitivity of the CCD of FIG. 7;

DETAILED DESCRIPTION OF THE PREFERRED EMBODIMENTS

Figure 1:
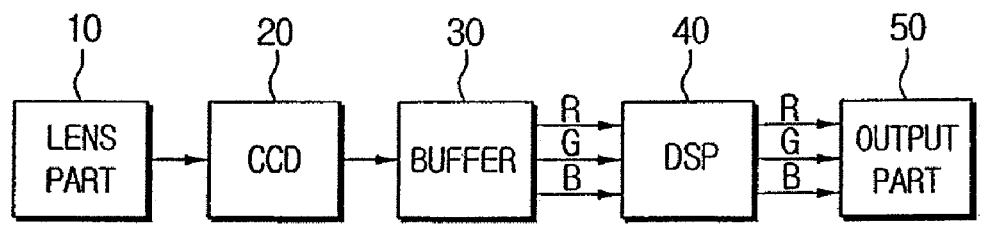
FIG. 1 is a block diagram illustrating a conventional digital image processing device.
Figure 2:
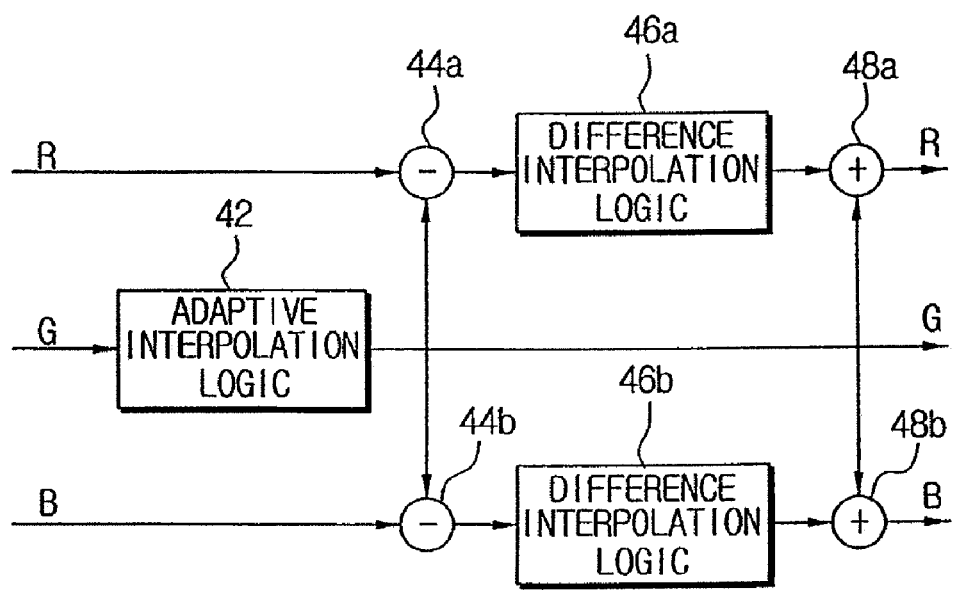
FIG. 2 is a detailed diagram illustrating the DSP of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the drawing figures.

Figure 5:
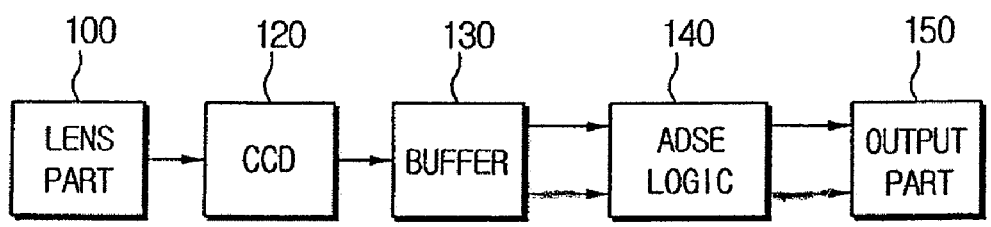
FIG. 5 is a block diagram illustrating a digital image processing apparatus according to an embodiment of the present general inventive concept.

FIG. 5 is a block diagram illustrating a digital image processing apparatus according to an embodiment of the present general inventive concept. Referring to FIG. 5, the digital image processing apparatus includes a lens part 100, a charge coupled device (CCD) 120, a buffer 130, an adaptive dual slope estimation (ADSE) logic 140, and an output part 150.

The lens part 100 has a zoom lens to enlarge and reduce magnification of an object, a focus lens to adjust focus of an object, and an iris to adjust the intensity of radiation. The CCD 120, which is used as a coupled device, photoelectrically transforms a photographed image into an electrical signal using a mosaic color filter array pattern. The buffer 130 stores the photoelectrically-transformed data by a frame or a field.

The ADSE logic 140 performs color interpolation by adaptively applying a luminance significance of each color with respect to data of the CCD 120 which has a single color data at each pixel stored in the buffer 130 so that each pixel has all of the color data. The output part 150 converts the color data interpolated in the ADSE logic 140 to a displayable signal and outputs the converted signal.

Figure 6:
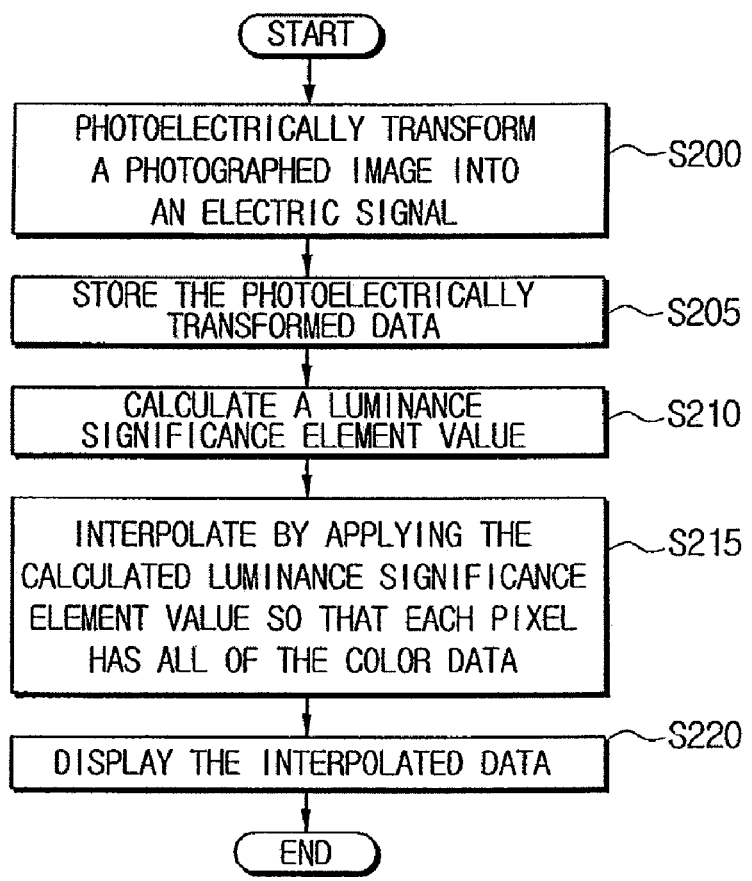
FIG. 6 is a flowchart illustrating exemplary operations of the digital image processing apparatus of FIG. 5, according to an embodiment of the present general inventive concept.

FIG. 6 is a flowchart illustrating exemplary operations of the digital image processing apparatus of FIG. 5, according to another embodiment of the present general inventive concept. Referring FIGS. 5 and 6, the CCD 120 photoelectrically transforms an image photographed by the lens part 100 into an electric signal (operation S200). If the CCD 120 is a YMCG mosaic CCD as shown in FIG. 7, the color data is processed based on the following equations.

$$Y = G + Cy + Mg + Ye$$

$$Cr = (Mg + Ye) - (G + Cy)$$

$$Cb = (Mg + Cy) - (G + Ye) \quad \text{[Equation 2]}$$

The buffer 130 stores the photoelectrically transformed data which is output from the CCD 120 by a frame or a field (operation S205).

The ADSE logic 140 color-interpolates the output data of the CCD 120, which has only one of yellow (Ye), magenta (Mg), cyan (Cy) and green (G) at each pixel, so that each pixel has all color data of Ye, Mg, Cy and G For this interpolation, an element value of the luminance significance is calculated (operation S210).

The element value of the luminance significance is calculated as below. Ye_Factor, Mg_Factor, Cy_Factor and G_Factor are calculated based on the following equations through integration in a wavelength range which belongs to a visible range as shown in FIG. 8.

$$Ye\_Factor = \frac{\int \overline{Ye}(\lambda) d\lambda}{\int \overline{Y}(\lambda) d\lambda} \quad \text{[Equation 3]}$$

$$Mg\_Factor = \frac{\int \overline{Mg}(\lambda) d\lambda}{\int \overline{Y}(\lambda) d\lambda}$$

$$Cy\_Factor = \frac{\int \overline{Cy}(\lambda) d\lambda}{\int \overline{Y}(\lambda) d\lambda}$$

-continued $$G\_Factor = \frac{\int \overline{G}(\lambda)d\lambda}{\int \overline{Y}(\lambda)d\lambda}$$

The luminance significance element values are obtained for the color interpolation with respect to each color, using the Ye_Factor, Mg_Factor, Cy_Factor and G_Factor calculated through Equation 3 and the followingthrough Equation 3 and the following equation.

$Kyc=(Ye\_Factor/Luminance)/(Cy\_Factor/Luminance)=Ye\_Factor/Cy\_Factor$ $Kcy=(Cy\_Factor/Luminance)/(Ye\_Factor/Luminance)=Cy\_Factor/Ye\_Factor$ $Kgm=(G\_Factor/Luminance)/(Mg\_Factor/Luminance)=G\_Factor/Mg\_Factor$ $Kmg=(Mg\_Factor/Luminance)/(G\_Factor/Luminance)=Mg\_Factor/G\_Factor$ [Equation 4]

The ADSE logic 140 interpolates colors by adaptively applying the calculated luminance significance element value with respect to the data of the CCD 120 having only one color data for each pixel stored in the buffer 130 so as to obtain all color data for each pixel (operation S215). That is, the luminance significance element values calculated through Equation 4 are reflected on the peak values of the related color, and is added to the calculated components through, for example, the linear interpolation to thus interpolate the color data which is spatially missing. For example, Ye33 at the pixel Cy33 of FIG. 7 is calculated based on the following equation.

$$Ye33 = [(Ye32 + Kyc * (Cy33 - Cy31)/2 + (Ye34 + Kyc *$$
$$(Cy33 - Cy35)/2]/2$$
$$= (Ye32 + Ye34)/2 + Kyc * (-Cy31 + 2 *$$
$$Cy33 - Cy35)/4$$

[Equation 5]

Figures 9, 10:
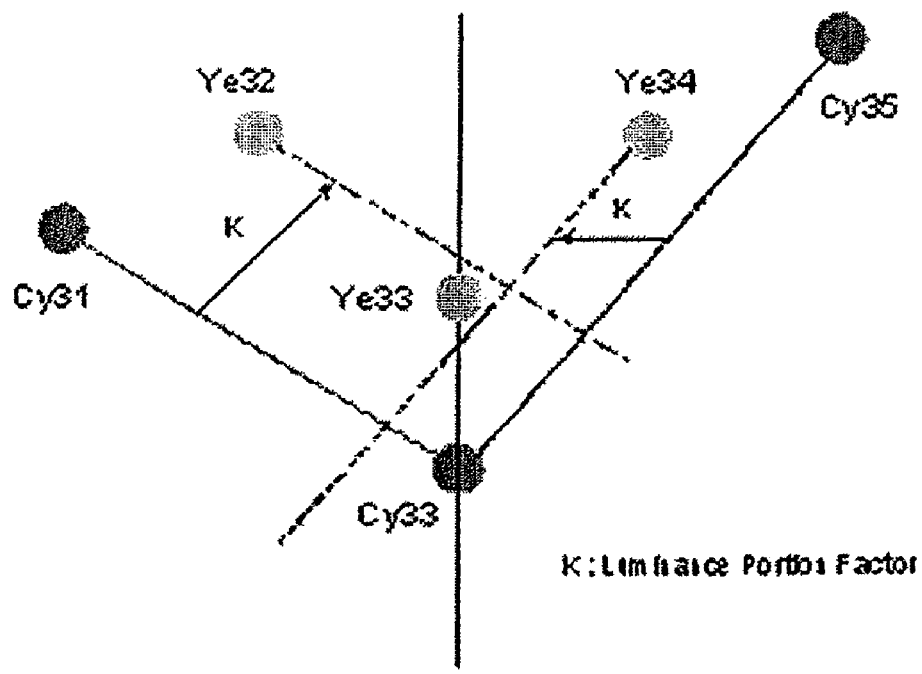
FIG. 9 is a view illustrating the color interpolation of the digital image processing apparatus according to an embodiment of the present general inventive concept.
FIG. 10 is a view illustrating configurations of YMCG, YCG, YCGW, and RGB mosaic CCDs.

In Equation 5, (Ye32+Ye34) denotes a component calculated through the linear interpolation, and (−Cy31+2*Cy33−Cy35)/4 corresponds to the peak value. The interpolation is performed by adaptively applying the luminance significance element value to the peak value as shown in FIG. 9. Specifically, K indicates the luminance significance element value. A line between Cy33 and Cy31 and a line between Cy33 and Cy35 are shifted due to K to the location of Ye33 to be interpolated. Accordingly, the so called "zipper" effect is reduced and the resolution is enhanced efficiently as compared with the conventional method of FIG. 4.

The output part 150 converts the data interpolated in the ADSE logic 140 to a displayable data and outputs the converted data. The interpolated color data can then be displayed (operation S220).

Figures 3, 4:
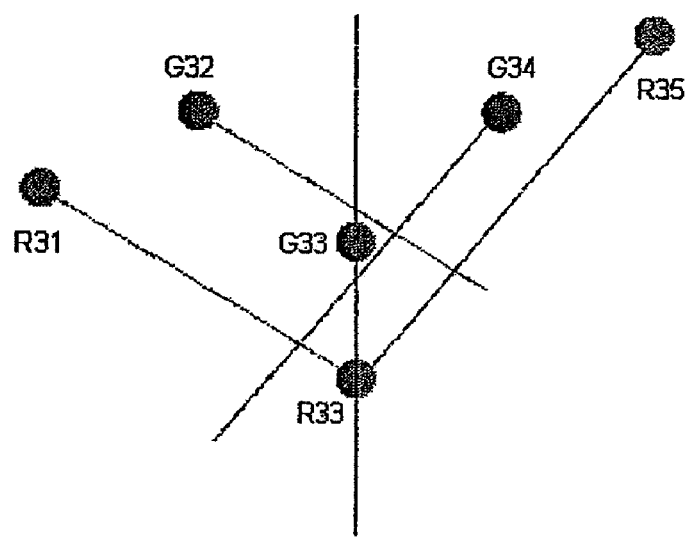
FIG. 3 is a view illustrating a configuration of the RGB mosaic DDC.
FIG. 4 is a graph illustrating the color interpolation by the conventional digital image processing device.

The YMCG mosaic CCD is exemplified in the above embodiment, but other mosaic CCD sensors may be used such as RGB mosaic CCD, YCGW mosaic CCD of FIG. 10 or YCG mosaic CCD. For example, if the RGB mosaic sensor of FIG. 3 is used, G33 can be calculated based on the following equation.

$$G_{33} = [(G_{32} + Kgr * (R_{33} - R_{31})/2) + (G_{34} + Kgr *$$
$$(R_{33} - R_{35})/2]/2$$
$$= (G_{32} + G_{34})/2 + Kgr * (-R_{31} + 2 *$$
$$R_{33} - R_{35})/4$$

[Equation 6]

In Equation 6, (G32+G34)/2 denotes the linear interpolation value, (−R31+2*R33−R35)/4 denotes the peak value, and Kgr denotes the luminance significance element value. Kgr is calculated based on the following equation.

$Kgr=(G\_Factor/Luminance)/(R\_Factor/Luminance)=G\_Factor/R\_Factor$ [Equation 7]

In Equation 7, if the integrated area is the same in the spectrum sensitivity of R, G, B mosaic CCD, the following equation can be obtained according to standard 709 of ITU-R Recommendations BT Series.

$Y=0.2126*R+0.7152*G+0.0722*B$ [Equation 8]

As a result, Kgr=0.7152/0.2126 since R_Factor=0.2126 G_Factor=0.7152 and B_Factor=0.0722.

As described above, the spatially missing color data can be interpolated at each pixel. Although a horizontal interpolation method is described in the above embodiment, a vertical interpolation may be applied alternatively. Also, other interpolations such as Cubic and Polyphase may be used in lieu of the linear interpolation. The digital image processing apparatus according to the embodiment of FIG. 5 may be implemented in hardware or programmed to be executed by a computer.

When the color interpolation is performed in the digital image processing apparatus which uses the mosaic CCD as the coupled device, the high resolution can be realized and the zipper effect can be reduced by adaptively applying the luminance significance with respect to each color.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. A digital image processing apparatus comprising:
   a charge coupled device (CCD) to photoelectrically transform an optical image which is imaged through a lens part using a mosaic color filter array pattern;
   a buffer to store a color data output from the CCD by a pixel into a predetermined unit; and
   an adaptive dual slope estimation (ADSE) logic to color-interpolate a spatially missing color data by adaptively applying a luminance significance element value to a certain color interpolation method, the luminance significance element value indicating contribution of each color to an entire luminance with respect to each pixel color data stored in the buffer.

2. The apparatus of claim 1, further comprising an output part to convert the color data interpolated in the ADSE logic to a displayable signal and output the displayable signal.

3. The apparatus of claim 1, wherein the ADSE logic performs the color interpolation by adding a component calculated by applying the certain color interpolation method with respect to color data of pixels neighboring a pixel to be interpolated, with a value interpolated by adaptively applying the luminance significance element value to a peak value of other color data of the neighboring pixels.

4. The apparatus of claim 1, wherein the CCD is one of a YMCG mosaic sensor, an RGB mosaic sensor, a YCGW mosaic sensor and a YCG mosaic sensor.

5. The apparatus of claim 1, wherein the predetermined unit is one of a field and a frame.

6. The apparatus of claim 1, wherein the certain color interpolation method is one of a linear interpolation, a bilinear interpolation, a Cubic interpolation and a Polyphase interpolation.

7. A digital image processing method comprising:
photoelectrically transforming an optical image which is imaged through a lens part, using a mosaic color filter array pattern in a charge coupled device (CCD);
storing a color data output from the CCD by a pixel in a predetermined unit; and
color-interpolating a spatially missing color data by adaptively applying a luminance significance element value to a certain color interpolation method, the luminance significance element value indicating contribution of each color to an entire luminance with respect to each pixel color data stored.

8. The method of claim 7, further comprising converting the interpolated color data to a displayable signal and outputting the displayable signal.

9. The method of claim 7, wherein the operation of color-interpolating the color data performs the color interpolation by adding a component calculated by applying the predetermined color interpolation method with respect to color data of pixels neighboring a pixel to be interpolated, with a value interpolated by adaptively applying the luminance significance element value to a peak value of other color data of the neighboring pixels.

10. The method of claim 7, wherein the predetermined unit is one of a field and a frame.

11. The method of claim 7, wherein the certain color interpolation method is one of a linear interpolation, a bilinear interpolation, a Cubic interpolation and a Polyphase interpolation.

12. A digital image processing apparatus comprising:
a buffer to store a color data transformed from an optical image using a mosaic color filter array pattern by a pixel into a predetermined unit; and
an adaptive dual slope estimation (ADSE) logic to color-interpolate a spatially missing color data by adaptively applying a luminance significance element value to a certain color interpolation method, the luminance significance element value indicating contribution of each color to an entire luminance with respect to each pixel color data stored in the buffer.

13. The apparatus of claim 12, further comprising an output part to convert the color data interpolated in the ADSE logic to a displayable signal and output the displayable signal.

14. The apparatus of claim 12, wherein the ADSE logic performs the color interpolation by adding a component calculated by applying the certain color interpolation method with respect to color data of pixels neighboring a pixel to be interpolated, with a value interpolated by adaptively applying the luminance significance element value to a peak value of other color data of the neighboring pixels.

15. The apparatus of claim 12, wherein the predetermined unit is one of a field and a frame.

16. The apparatus of claim 12, wherein the certain color interpolation method is one of a linear interpolation, a bilinear interpolation, a Cubic interpolation and a Polyphase interpolation.

17. A digital image processing method comprising:
storing a color data transformed from an optical image using a mosaic color filter array pattern by a pixel into a predetermined unit; and
color-interpolating a spatially missing color data by adaptively applying a luminance significance element value to a certain color interpolation method, the luminance significance element value indicating contribution of each color to an entire luminance with respect to each pixel color data stored.

18. The method of claim 17, further comprising converting the interpolated color data to a displayable signal and outputting the displayable signal.

19. The method of claim 17, wherein the operation of color-interpolating the color data performs the color interpolation by adding a component calculated by applying the predetermined color interpolation method with respect to color data of pixels neighboring a pixel to be interpolated, with a value interpolated by adaptively applying the luminance significance element value to a peak value of other color data of the neighboring pixels.

20. The method of claim 17, wherein the predetermined unit is one of a field and a frame.

21. The method of claim 17, wherein the certain color interpolation method is one of a linear interpolation, a bilinear interpolation, a Cubic interpolation and a Polyphase interpolation.

22. A computer readable storage medium encoded with a computer program when executed by a computer performs a method of digital image processing, the method comprising:
photoelectrically transforming an optical image which is imaged through a lens part, using a mosaic color filter array pattern;
storing a color data output from the CCD by a pixel in a predetermined unit; and
color-interpolating a spatially missing color data by adaptively applying a luminance significance element value to a certain color interpolation method, the luminance significance element value indicating contribution of each color to an entire luminance with respect to each pixel color data stored.

23. The computer readable storage medium of claim 22, wherein the method further comprises converting the interpolated color data to a displayable signal and outputting the displayable signal.

24. The computer readable storage medium of claim 22, wherein the operation of color-interpolating the color data performs the color interpolation by adding a component calculated by applying the predetermined color interpolation method with respect to color data of pixels neighboring a pixel to be interpolated, with a value interpolated by adaptively applying the luminance significance element value to a peak value of other color data of the neighboring pixels.

25. The computer readable storage medium of claim 22, wherein the predetermined unit is one of a field and a frame.

26. The computer readable storage medium of claim 22, wherein the certain color interpolation method is one of a linear interpolation, a bilinear interpolation, a Cubic interpolation and a Polyphase interpolation.

27. A digital image processing apparatus comprising:

a memory unit to store pixel color data output from an external optical image sensor; and a logic unit to color-interpolate a spatially missing color data by adaptively applying a luminance significance element value to a certain color interpolation method, the luminance significance element value indicating contribution of each color to an entire luminance with respect to each pixel color data stored in the memory unit.

28. A digital image processing method comprising:

storing pixel color data output from an external optical image sensor; and color-interpolating a spatially missing color data by adaptively applying a luminance significance element value to a certain color interpolation method, the luminance significance element value indicating contribution of each color to an entire luminance with respect to each pixel color data stored.

* * * * *